United States Patent [19]

Eichholz

[11] Patent Number: 4,753,016

[45] Date of Patent: Jun. 28, 1988

[54] CONDENSATION PROCESS AND APPARATUS FOR WATER VAPOR THAT IS UNDER A VACUUM

[76] Inventor: Heinz Eichholz, Kolpingstrasse 21, 4441 Schapen, Fed. Rep. of Germany

[21] Appl. No.: 35,975

[22] Filed: Apr. 8, 1987

[30] Foreign Application Priority Data

Apr. 8, 1986 [DE] Fed. Rep. of Germany ....... 3611773

[51] Int. Cl.$^4$ .............................................. F26B 19/00
[52] U.S. Cl. ........................................ 34/86; 34/183; 122/26
[58] Field of Search .......................... 34/86, 182, 183; 165/47; 122/26

[56] References Cited

U.S. PATENT DOCUMENTS

| | | | |
|---|---|---|---|
| 2,021,012 | 11/1935 | McCullough | 34/183 X |
| 2,478,889 | 8/1949 | Harris | 34/183 X |
| 3,392,455 | 7/1968 | Kingsbaker, Jr. et al. | 34/182 X |
| 3,605,273 | 9/1971 | Andersen | 34/183 X |
| 4,276,701 | 7/1981 | Takacs et al. | 34/183 X |
| 4,290,269 | 9/1981 | Hedstrom et al. | 34/86 X |
| 4,331,085 | 5/1982 | Tyer et al. | 34/182 X |

*Primary Examiner*—William E. Tapolcai
*Attorney, Agent, or Firm*—Felfe & Lynch

[57] ABSTRACT

A condensation process and apparatus for water vapor under vacuum which is taken preferably from a drying apparatus. The vacuum is produced by a water ring vacuum pump through which water flows, and the water vapor in the liquid ring vacuum pump is condensed into the liquid. The water is carried in a water circuit with at least one heat exchanger yielding heat from the water for heating purposes. Before flowing into the water ring vacuum pump, the water carried in the circuit is passed through a heat exchanger transferring waste heat from the pump and the pump drive to the water. Heat losses are prevented by a casing of thermal insulation surrounding the pump as well as the heat exchanger.

13 Claims, 3 Drawing Sheets

CONDENSATION PROCESS AND APPARATUS FOR WATER VAPOR THAT IS UNDER A VACUUM

BACKGROUND OF THE INVENTION

The invention relates to a condensation process for water vapor under a vacuum, which is taken preferably from a drying apparatus, the vacuum being produced by a liquid ring vacuum pump through which a liquid flows, and the vapor in the liquid ring vacuum pump being condensed into the liquid flowing through the latter.

Such condensation processes are used, for example, in vacuum drying apparatus which serve for the rapid and gentle removal of water contained in moist material that must be dried. For example, the German Patent Publication No. 28 21 259 describes a vacuum drying kiln for drying wood, in which a condensation of the withdrawn water vapor is performed by this method. To reduce energy losses, the thermal energy removed from the water vapor is used for heating the drying kiln. A disadvantage, however, is the high cost and complexity involved in the known process. For example, two separate fluid circuits are provided, one of the circuits even carrying two different fluids of known properties, since the different fluids, one of which is water, have to be separated again in the course of the process. Very high technical complexity and cost are involved in the realization of this process. The Chemical Abstracts, vol. 73 (1970) Ref. No. 132,387y, discloses the recovery of heat in the condensation of water vapor into running water at reduced pressure. The application of this process, however, is essentially the condensation of exhaust steam from steam turbines using the recovered heat to improve the efficiency of the transformation of thermal energy into mechanical energy. This process is not suitable for drying and/or heating purposes.

SUMMARY OF THE INVENTION

The principal objective of the present invention is to devise a condensation process, of the type referred to above, which will avoid the stated disadvantages, and especially which will be simple in operation, will require less expensive and complex apparatus, and have an especially desirable heat balance. It is a further principal objective to provide an apparatus for this practice of the process.

These as well as other objectives are achieved, according to the invention, by a process wherein water is used as the liquid flowing through the liquid ring vacuum pump; wherein the water is carried in a water circuit with at least one heat exchanger yielding heat from the water for heating purposes; wherein, before flowing into the water ring vacuum pump, the water carried in the circuit is passed through a heat exchanger transferring waste heat from the pump and the pump drive to the water; and wherein heat losses are prevented by a casing of thermal insulation surrounding the pump and its drive as well as the heat exchanger.

In this manner it is brought about that the heat contained in the vapor itself, as well as the condensation heat, is recovered and delivered to the water. A simplification of the process is achieved primarily by reduction to a single fluid, namely water. The low technical expense results furthermore from the fact that the vacuum pump simultaneously serves as a heat pump. The heat balance becomes especially favorable due to the additional utilization of the waste heat from the pump and its drive and to the avoidance of heat losses by the insulated casting.

For applications calling for a higher vacuum than can be achieved with the water ring vacuum pump, the latter can be operated as a vacuum forepump preceded by a rotary valve vacuum pump or a gas ring vacuum pump.

The second principal objective, namely the creation of an apparatus for the performance of the process, is accomplished by providing an apparatus having a liquid ring vacuum pump; a water vapor feed line connected to the intake side of the liquid ring vacuum pump; a supply line carrying a liquid to the liquid ring vacuum pump; and a discharge line carrying the liquid away from the liquid ring vacuum pump. According to the invention, the liquid ring vacuum pump carries water as the liquid; at least one heat exchanger is connected between the water discharge line and the water feed line and yields heat from the water carried in the circuit for heating purposes; a further heat exchanger which transfers waste heat from the pump and the pump drive motor to the water, is inserted ahead of the pump, in the water feed line; and a thermal insulation casing, having pipe lead-throughs, surrounds the pump with its drive motor.

For a full understanding of the present invention, reference should now be made to the following detailed description of the preferred embodiments of the invention and to the accompanying drawings.

DESCRIPTION OF THE PREFERRED EMBODIMENTS

Figure 1:
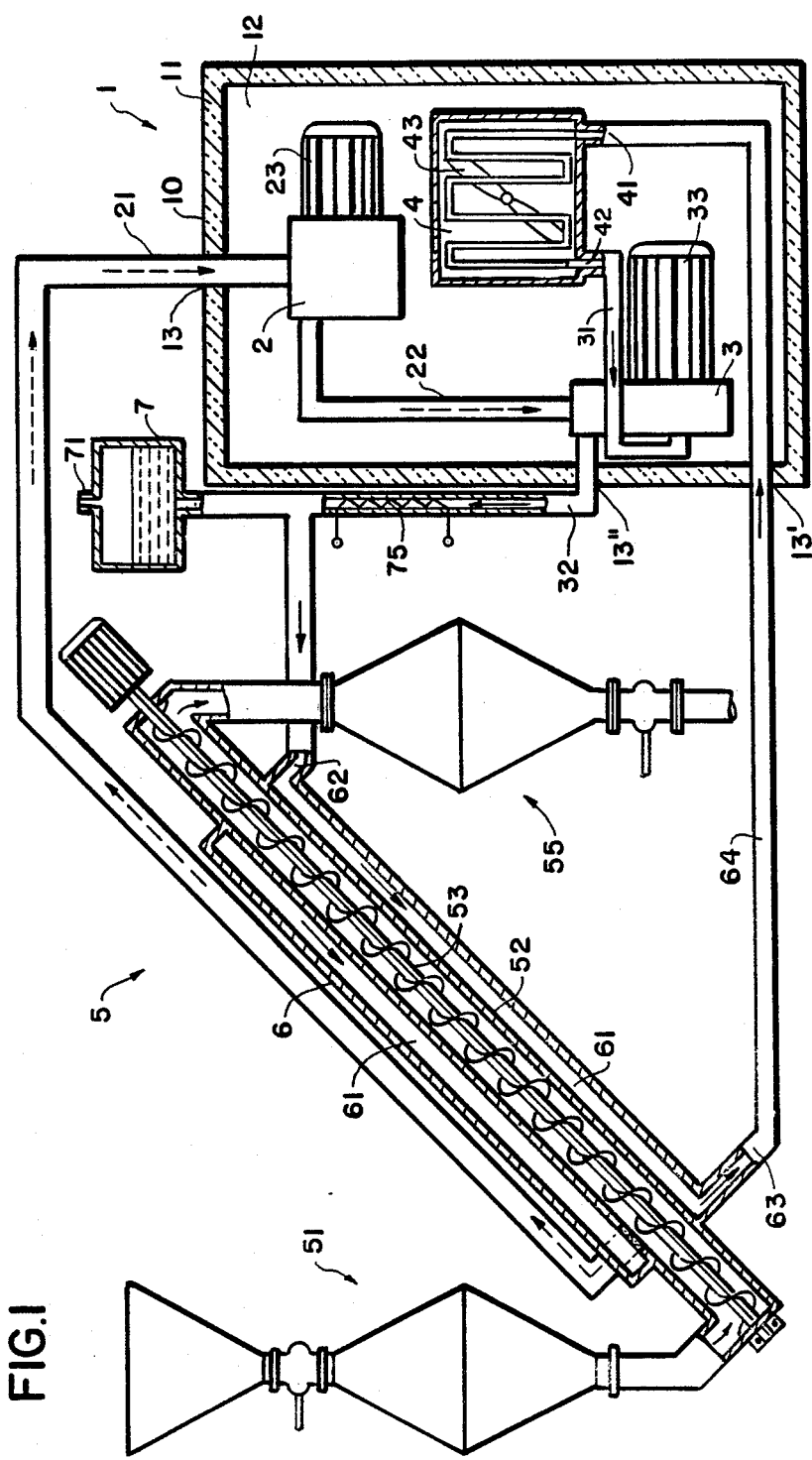
FIG. 1 is a diagrammatic representation of an apparatus according to the invention configured as part of a vacuum drying apparatus.

As it can be seen in the right part of FIG. 1, the represented embodiment of the apparatus 1 according to the invention, which here is combined with a vacuum drying apparatus 5, consists essentially of a first vacuum pump 2, a water ring vacuum pump 3 as the second vacuum pump, and a heat exchanger 4. At its intake side the first vacuum pump 2, preferably a rotary valve vacuum pump or a gas ring vacuum pump, has a vapor feed line 21 which can be placed under vacuum by means of the pumps 2 and 3. On the discharge side the vacuum pump 2 is connected to a vapor connecting line 22 which is connected to the intake side of the water ring vacuum pump in which a preliminary vacuum prevails. Water flows through the water ring vacuum pump 3, and therefore it has a water supply line 31 as well as a water discharge line 32. The pumps 2 and 3 are powered by motors 23 and 33, respectively, which are preferably electric motors. The heat exchanger 4, which is connected by an inlet 41 and an outlet 42 to the water supply line 31, serves for the utilization of the waste heat of the drive system. The two pumps 2 and 3 as well as the heat exchanger 4 are within a closed casing 10 having a thermal insulation 11 as well as pipe lead-throughs 13, 13' and 13''. This serves to minimize heat losses to the exterior. The warmed air in the interior 12 of the casing 10 is, in this embodiment, driven by a fan 43 through the heat exchanger 4. A single fan, appropriately installed, can also serve to produce the movement of air required both for the motors 23 and 33 and for the heat exchanger 4.

The operation of the apparatus, i.e., the manner in which the process is performed, is as follows:

Water of relatively low temperature enters the heat exchanger 4 where it is preheated by warm air produced by the pumps and their drives. The preheated water passes through the water supply line 31 to the water ring vacuum pump 3. Water vapor of very low pressure containing thermal energy passes through the vapor feed line 21, which is under a high vacuum, to the vacuum pump 2, and from there at slightly higher pressure through the vapor intermediate line 22 also to the water ring vacuum pump 3. In the latter the water vapor is condensed into the water flowing through the pump, while the thermal energy as well as the produced heat of condensation pass into the water. The water thus heated leaves the water ring vacuum pump 3 through the water discharge line 32 and is available for heating purposes.

For preheating in the start-up of the apparatus, and for support in the case of insufficient heat yield, a preheating and booster heating device 75, e.g., an electrically powered heating coil, is installed in the line 32. At the highest point in the water discharge line 32 there is also provided an equalizing tank 7 with a vent 71. In addition to what is represented in the embodiment, the heating device 75 and the equalizing vessel 7 can also be disposed in the interior 12 of the casing 10.

The especially advantageous combination of the apparatus 1 with the vacuum drying apparatus 5 results especially from the fact that not only can the water vapor be taken from the drying apparatus 5 but also the heated water can be used to good effect in the latter. The vacuum drying apparatus 5 provided here for combination with the apparatus 1 according to the invention, by which plastic granules, for example, can be dried, consists essentially of an input section 51, a conveyor tube 52 with a motor driven screw rotating therein, and a discharge part 55 for the batch drying of a free-flowing material such as the above-mentioned granules. The input part 51 consists of an input funnel, a shut-off valve and a supply hopper, and the output part in like manner of a collecting hopper with a shut-off valve and a discharge tube at the bottom. After the supply hopper is filled and the two shut-off valves are closed, the material to be dried is continuously fed by the screw through the conveyor tube into the collecting hopper on the output side, while a vacuum to evaporate the moisture in the material is produced within the conveyor tube through the line 21 by means of the apparatus 1. On its outside the conveyor tube 52 is surrounded by a heating jacket 6 through which hot water flows. This hot water originates in the apparatus 1 and passes through the water discharge line 32 and an input connection 62, into the water chamber 61 of the heating jacket 6, which is preferably provided with thermal insulation on its exterior. It is desirable in this case to feed the water countercurrently to the material to be dried. The cooled water passes through an outlet 63 and a return line 64 back to the water feed line 31 and thus into the apparatus 1 to be reheated in the latter.

With the apparatus described above a very desirable energy balance is achieved, for both the heat removed with the vapor from the material being dried and the heat of the condensation of the vapor as well as the waste heat of the pump motors is recovered as thoroughly as possible. Heat losses to the surroundings occur to only a very slight extent. The booster heater 75 is operated only on start-up or in the case of a particularly high heat requirement.

A second embodiment of the process according to the invention and of the corresponding apparatus 1 will now be described in conjunction with FIG. 2. The apparatus 1 is entirely the same as the one represented in FIG. 1 and therefore need not be explained again. The difference between this apparatus that shown in and FIG. 1 consists in the way the apparatus is used. In the application example in FIG. 1, the water vapor was removed from the material being dried and the heated water was used to heat the material. The vapor in that case originates in the moisture content of the material fed from the outside into the apparatus to be dried.

Figure 2:
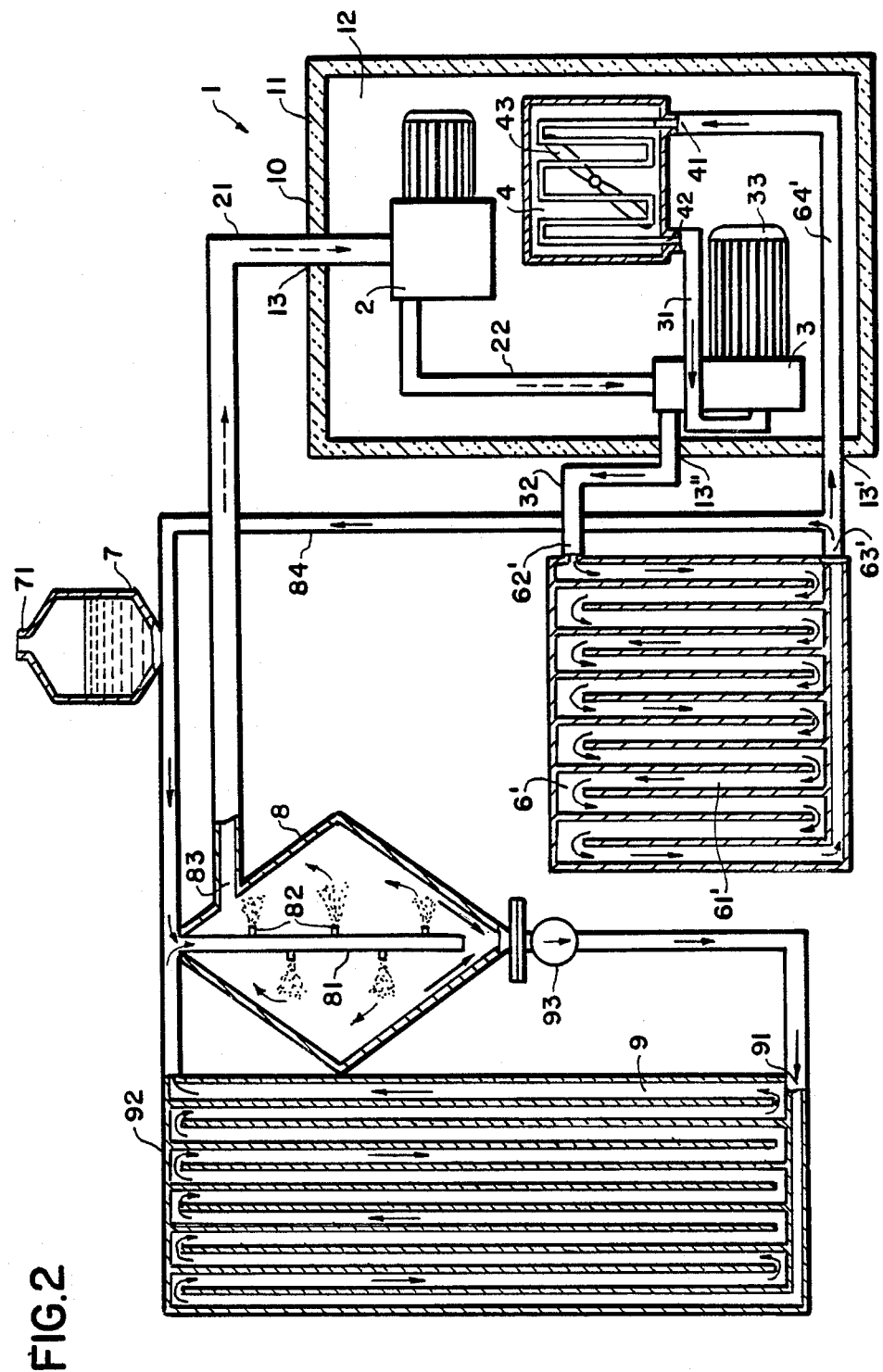
FIG. 2 is also a diagrammatic representation of a further embodiment of the invention in the form of a heat pump heating system.

In the application example in FIG. 2, however, a completely closed system is involved. The water vapor in this case is produced inside a vacuum spray chamber 8 by spraying water through a tube 81 provided with spray nozzles 82. The vapor passes through an outlet 83 from the spray chamber 8 through the vapor feed line 21 to the apparatus 1. In the apparatus 1, in a known manner, the thermal energy contained in the vapor as well as the waste heat from the pump motors is fed to the water flowing through the water ring vacuum pump. The water thus heated passes through the water discharge line 22 in this example through an inlet 62' to the water chamber 61' of a radiator 6'. There the water yields its heat for heating purposes and after cooling passes through a return line 63' and a water return line 64' back into the apparatus 1 and there through the heat exchanger 4 to the water ring vacuum pump.

From the return line 63' and the water return line 64' a water branch line 84 is tapped, which leads to the spray tube 81 in the spray chamber 8. Through this line the amount of evaporated water that is withdrawn through the vapor outlet 83 is replaced. At the same time the spray chamber 8 forms a part of a second circuit. This circuit consists of an absorber 9 which is connected by an inlet 91, an outlet 92 and a water pump 93 to the spray chamber 8. The pump 93 underneath the chamber 8 pumps the precipitated water and the water that has not been evaporated in chamber 8 through the absorber 9 where it is heated by absorbing ambient or waste heat. From the absorber 9 the water, heated, together with the water brought in through the branch line 84, passes into the spray tube 81 to be sprayed into the spray chamber 8. Thus the water vapor produced in the chamber 8 receives a comparatively high heat content which is transformed in the apparatus 1, in a known manner, into thermal energy usable for heating purposes.

Instead of or in addition to heating the water prior to spraying in chamber 8, provision can also be made for the use of an absorber for heating the water vapor produced in chamber 8. In this embodiment also, an equalizing tank 7 with a vent 71 is provided at the highest point of the water circuit in the water branch line 84.

Since in this application of the apparatus 1 a lower vacuum is sufficient for the operation, the vacuum pump 2 can be omitted. This means that the vapor feed line 21 may be connected directly to the intermediate vapor line 22, i.e., to the water ring vacuum pump 3, resulting in an especially simple and low-cost embodiment of the apparatus for the performance of the process according to the invention.

Figure 3:
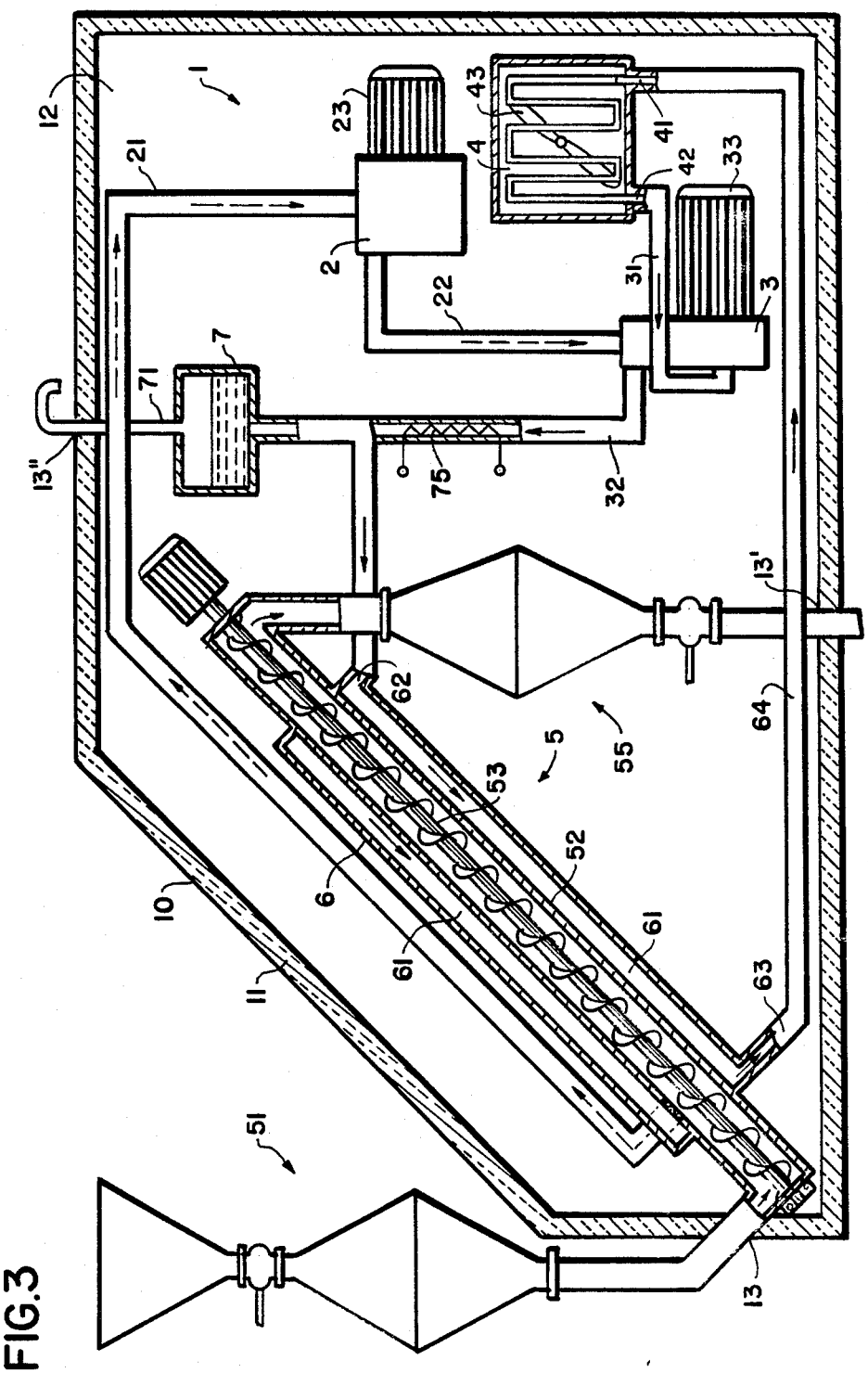
FIG. 3 is a diagrammatic representation of the apparatus according to FIG. 1 in a second embodiment.

FIG. 3 shows the apparatus of FIG. 1 in a second embodiment. The main new item of this embodiment is that the thermal insulating casing 10, 11 not only encloses the vacuum pumps 2 and 3 and the heat exchanger 4, but also, with the exception of the input section 51, the vacuum drying apparatus 5, the equalizing tank 7 and the lines 21, 32 and 64, connecting the apparatus 1 and the drying apparatus 5. This arrangement achieves exceedingly good energy efficiency. Practical tests have shown that temperatures of up to 90° C. can be reached in the line 32, leading the water from the apparatus 1 to the drying apparatus 5, without additional heating.

In its operation the apparatus of FIG. 3 corresponds to that of the apparatus of FIG. 1, so that a repetition of the previous explanation is unnecessary. Further, like numerals in the FIGS. 1 and 3 denote like parts of the apparatus and thus reference is made to FIG. 1.

The greatest advantages of the use of the process according to the invention, and the use of the apparatus, will, of course, be realized wherever both a vacuum and thermal energy are simultaneously required, yet an application only for the production of heat in the manner of a heat pump is feasible. A special advantage in the use of the process or apparatus as a heat pump consists in using water as the fluid instead of dangerous refrigerants such as ammonia or chlorofluorocarbons. Additional possibilities of application of the process and apparatus are in the field of distillation where heat recovery is also of great importance.

There has thus been shown and described a novel condensation and apparatus process for water vapor that is under a vacuum which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claimed which follows.

I claim:

1. In a condensation process for water vapor that is under a vacuum and which is preferentially taken from a drying apparatus, the vacuum being produced by a liquid ring vacuum pump through which a liquid flows, and the vapor being condensed in the liquid ring vacuum pump into the liquid flowing through the latter, the improvement wherein water is used as the liquid flowing through the liquid ring vacuum pump; wherein the water is carried in a water circuit with at least one heat exchanger yielding heat from the water for heating purposes; wherein the water carried in the circuit, before flowing into the water ring vacuum pump, is passed through a heat exchanger transferring to the water waste heat from the pump and pump drive; and wherein heat losses are prevented by a thermal insulation casing surrounding the pump and its drive as well as the heat exchanger.

2. The condensation process according to claim 1, wherein the liquid ring vacuum pump is operated as a forepump preceded by a separate vacuum pump.

3. The condensation process according to claim 2, wherein the separate vacuum pump is a rotary valve vacuum pump.

4. The condensation process according to claim 2, wherein the separate vacuum pump is a gas ring vacuum pump.

5. The condensation process according to claim 1, wherein the water vapor is taken as waste vapor from an apparatus for vacuum drying of materials.

6. The condensation process according to claim 1, wherein the heat-yielding heat exchanger is part of the vacuum drying apparatus and yields heat to the material being dried.

7. The condensation process according to claim 1, wherein the vapor is produced by spraying water tapped for the water circuit of the liquid ring vacuum pump in a closed vacuum spray chamber and wherein at least one of the water before spraying and the vapor produced by the spraying are carried through an absorber for the absorption of ambient heat and waste heat.

8. In apparatus for the performance of the process recited in claim 1, comprising (a) a liquid ring vacuum pump with a water vapor feed line connected to the intake side; (b) a feed line feeding liquid to the liquid ring vacuum pump; and (c) a discharge line discharging the liquid from the liquid ring vacuum pump; the improvement wherein water is used as the liquid flowing through the liquid feed line, the liquid ring vacuum pump and the liquid discharge line; and wherein the apparatus further comprises (1) at least one heat exchanger connected between the water discharge line and the water feed line and yielding heat from the water carried in the circuit for heating purposes; (2) a heat exchanger transferring waste heat from the pump and pump drive to the water, which is inserted into the water feed line ahead of the pump; and (3) a thermally insulated housing surrounding the pump with its drive and having pipe lead-throughs.

9. The apparatus according to claim 8, further comprising a separate vacuum pump connected ahead of the liquid ring vacuum pump.

10. The apparatus according to claim 9, wherein the separate vacuum pump is a rotary valve vacuum pump.

11. The apparatus according to claim 9, wherein the separate, vacuum pump is a gas ring vacuum pump.

12. The apparatus according to claim 8, further comprising a preheating and booster heating device disposed in the water discharge line.

13. The apparatus according to claim 8, wherein the thermal insulating casing additionally encloses a vacuum drying apparatus that feeds water vapor to the vacuum pump through the water vapor feed line, and in which goods to be dried are heated by the heat exchanger.

* * * * *